US009619901B2

(12) United States Patent
Mikuriya et al.

(10) Patent No.: US 9,619,901 B2
(45) Date of Patent: Apr. 11, 2017

(54) IMAGE PROCESSING APPARATUS, IMAGE PROCESSING METHOD, AND NON-TRANSITORY COMPUTER READABLE MEDIUM USING AN ELIMINATION COLOR TO DETERMINE COLOR PROCESSING FOR A DOCUMENT IMAGE

(71) Applicant: FUJI XEROX CO., LTD., Tokyo (JP)

(72) Inventors: Hiroshi Mikuriya, Kanagawa (JP); Taro Mori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/847,616

(22) Filed: Sep. 8, 2015

(65) Prior Publication Data
US 2016/0284106 A1 Sep. 29, 2016

(30) Foreign Application Priority Data

Mar. 24, 2015 (JP) ................................ 2015-060808

(51) Int. Cl.
*G06K 9/34* (2006.01)
*G06T 11/00* (2006.01)
(52) U.S. Cl.
CPC .................................. *G06T 11/001* (2013.01)
(58) Field of Classification Search
None
See application file for complete search history.

(56) References Cited

U.S. PATENT DOCUMENTS

| 7,925,082 B2* | 4/2011 | Itoh ...................... G06K 9/2063 382/162 |
| 9,049,320 B2 | 6/2015 | Hashimoto et al. |
| 2006/0215911 A1* | 9/2006 | Ashikaga .......... G06F 17/30011 382/190 |
| 2007/0171473 A1* | 7/2007 | Iwasaki ............. G06F 17/30011 358/1.18 |
| 2007/0206851 A1* | 9/2007 | Itoh ...................... G06K 9/2063 382/164 |

(Continued)

FOREIGN PATENT DOCUMENTS

JP 2013-143595 A 7/2013

OTHER PUBLICATIONS

Stevens et al, Automatic Processing of Document Annotations. http://citeseerx.ist.psu.edu/viewdoc/citations?doi=10.1.1.75.2036, 1998.*

(Continued)

*Primary Examiner* — Andrae S Allison
(74) *Attorney, Agent, or Firm* — Oliff PLC

(57) ABSTRACT

An image processing apparatus includes an image information acquisition unit, an elimination color setting unit, and a processing unit. The image information acquisition unit acquires image information of a document image in which multiple colors that are different from a predetermined document color are added to an image which is rendered in the predetermined document color. The elimination color setting unit sets a color which is defined as an elimination color from among the multiple colors. The processing unit performs predetermined processing for a color among the multiple colors that is different from the elimination color set by the elimination color setting unit.

15 Claims, 13 Drawing Sheets

(56) References Cited

U.S. PATENT DOCUMENTS

| | | | | |
|---|---|---|---|---|
| 2008/0239365 A1* | 10/2008 | Salgado | ............... | G06F 17/212 358/1.15 |
| 2010/0008585 A1* | 1/2010 | Saito | ................... | G06K 9/2054 382/190 |
| 2011/0305387 A1* | 12/2011 | Al-Omari | ......... | G06K 9/00463 382/165 |

OTHER PUBLICATIONS

T. Nakai, K. Kise, and M. Iwamura. A method of annotation extraction from paper documents using alignment based on local arrangements of feature points.In Proceedings of 9th International Conference on Document Analysis and Recognition (ICDAR2007), pp. 23-27, Sep. 2007.*

* cited by examiner

IMAGE PROCESSING APPARATUS, IMAGE PROCESSING METHOD, AND NON-TRANSITORY COMPUTER READABLE MEDIUM USING AN ELIMINATION COLOR TO DETERMINE COLOR PROCESSING FOR A DOCUMENT IMAGE

CROSS-REFERENCE TO RELATED APPLICATIONS

This application is based on and claims priority under 35 USC 119 from Japanese Patent Application No. 2015-060808 filed Mar. 24, 2015.

BACKGROUND (i) Technical Field

The present invention relates to an image processing apparatus, an image processing method, and a non-transitory computer readable medium.

(ii) Related Art

A technique for recognizing, in the case where writing with a highlighter pen is performed on a monochrome document, an added image added by the writing with the highlighter pen on a document image obtained by reading with a scanner the document on which the writing is performed, has been suggested. With such a technique, for example, in the case where a seal is affixed to a monochrome document and then writing with a highlighter pen is performed, there has been a demand for recognizing an added image added by the seal and an added image added by the writing with the highlighter pen so as to be discriminated from each other.

SUMMARY

According to an aspect of the invention, there is provided an image processing apparatus including an image information acquisition unit, an elimination color setting unit, and a processing unit. The image information acquisition unit acquires image information of a document image in which multiple colors that are different from a predetermined document color are added to an image which is rendered in the predetermined document color. The elimination color setting unit sets a color which is defined as an elimination color from among the multiple colors. The processing unit performs predetermined processing for a color among the multiple colors that is different from the elimination color set by the elimination color setting unit.

BRIEF DESCRIPTION OF THE DRAWINGS

Exemplary embodiment of the present invention will be described in detail based on the following figures, wherein.

DETAILED DESCRIPTION

Hereinafter, an exemplary embodiment of the present invention will be described in detail with reference to the attached drawings.

First Exemplary Embodiment

First, an image processing apparatus according to an exemplary embodiment will be described.

Figure 1:
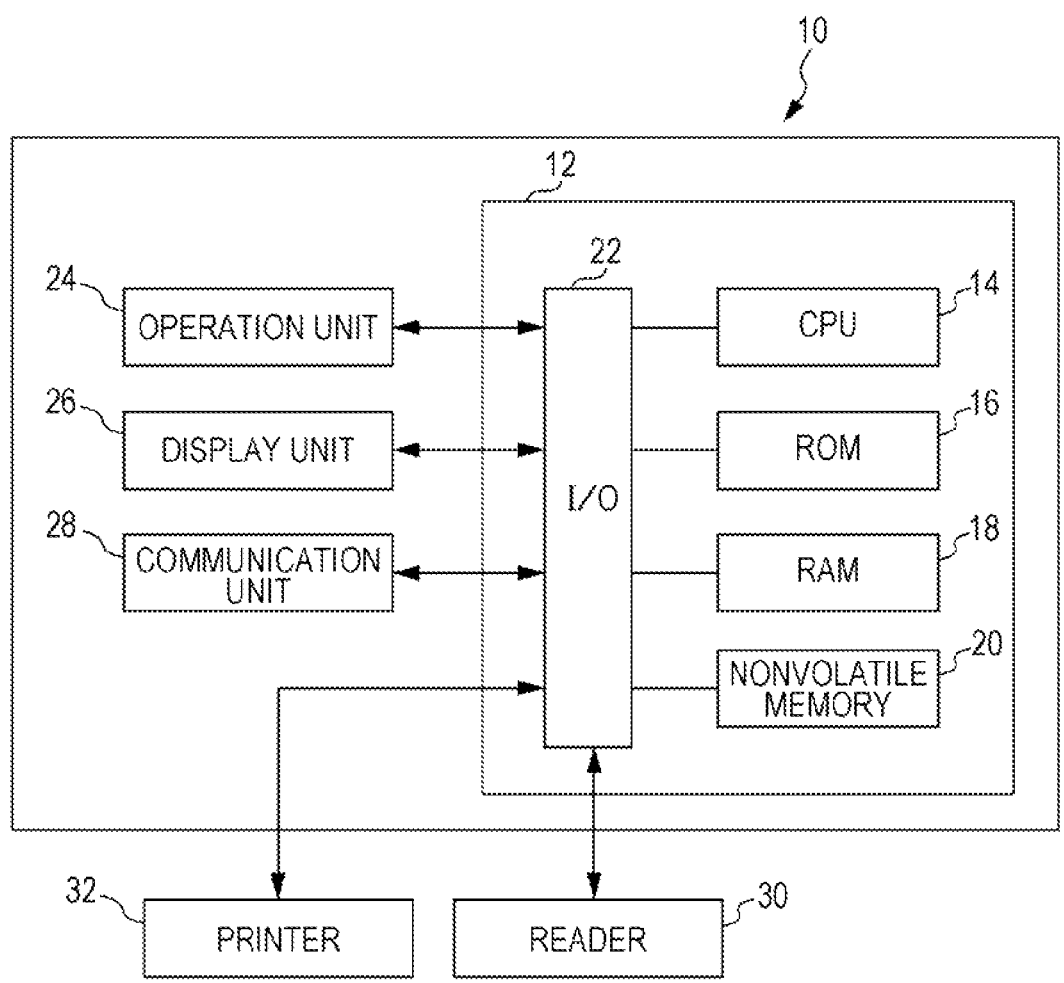
FIG. 1 is a block diagram illustrating an electrical configuration of an image processing apparatus according to an exemplary embodiment.

As illustrated in FIG. 1, an image processing apparatus 10 according to this exemplary embodiment includes a controller 12 that controls the entire apparatus. The controller 12 includes a central processing unit (CPU) 14 that executes various types of processing including image evaluation processing described below, and a read only memory (ROM) 16 that stores a program and various types of information which are used for the processing of the CPU 14. The controller 12 also includes a random access memory (RAM) 18 that temporarily stores various data as a work area of the CPU 14, and a nonvolatile memory 20 that stores various types of information which are used for the processing of the CPU 14. The controller 12 also includes an input/output (I/O) interface 22 that inputs and outputs data from and to an external apparatus which is connected to the image processing apparatus 10.

To the I/O interface 22, an operation unit 24 that is operated by a user, a display unit 26 that displays various types of information, and a communication unit 28 that communicates with an external apparatus are connected. Furthermore, to the I/O interface 22, a reader 30 that reads an image which is printed on a printing medium and a printer 32 that prints an image on a printing medium are connected.

In this exemplary embodiment, the reader 30 is configured to include, for example, a color scanner. The reader 30 reads a read target which is disposed at a predetermined read position, generates image information which is represented by RGB based on the read image, and outputs the generated image information. Furthermore, in this exemplary embodiment, the printer 32 is configured to include, for example, a color printer. The printer 32 prints image information which is represented by RGB on a printing medium.

The image processing apparatus 10 according to this exemplary embodiment acquires image information of a document image in which multiple added images in multiple colors different from a predetermined document color (for example, black) are added to a document in which an image is rendered in the predetermined document color on a printing medium. The image processing apparatus 10 also acquires information which indicates an elimination color to be used for identifying the added image from the document image. Then, the image processing apparatus 10 generates a specific color elimination image in which a specific color image rendered in a specific color which is different from the elimination color among the multiple colors is eliminated from the multiple added images of the document image. The image processing apparatus 10 further generates an identification possible image in which the specific color image may be identified from the specific color elimination image. The identification possible image is, for example, an image in which a region corresponding to the specific color image in the document image is concealed.

Figure 2A:
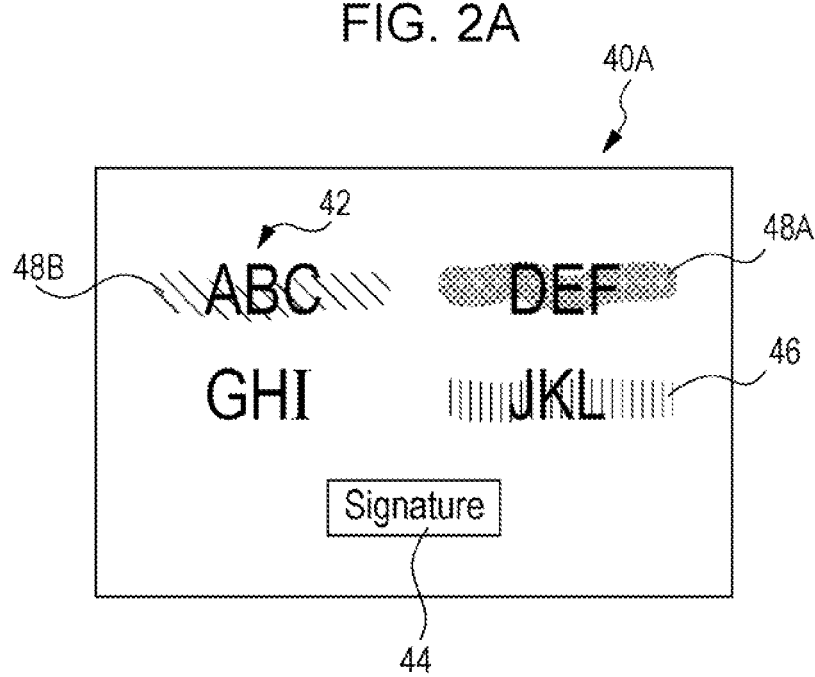
FIG. 2A is a front view illustrating an example of a document image according to an exemplary embodiment.

For example, as illustrated in FIG. 2A, in a document image 40A, an added image 44 by a seal, an added image 46 by a red highlighter pen, an added image 48A by a green highlighter pen, and an added image 48B by a blue highlighter pen are added to a document in which an image 42 is rendered in a document color. In this example, in the image 42, alphabetical letters A to L are rendered. For the purpose of concealment or the like of confidential information, it may be desired that parts of the image 42 that are rendered in regions in which the added images by the highlighter pens are added are concealed while the other parts of the image 42 and the added image 44 added by the seal being maintained. In this case, if in the document image 40A, all the parts of the image 42 that are rendered in the regions in which the added images in colors different from the document color are added are concealed, the region in which the added image 44 added by the seal is also inevitably concealed.

Figure 2B:
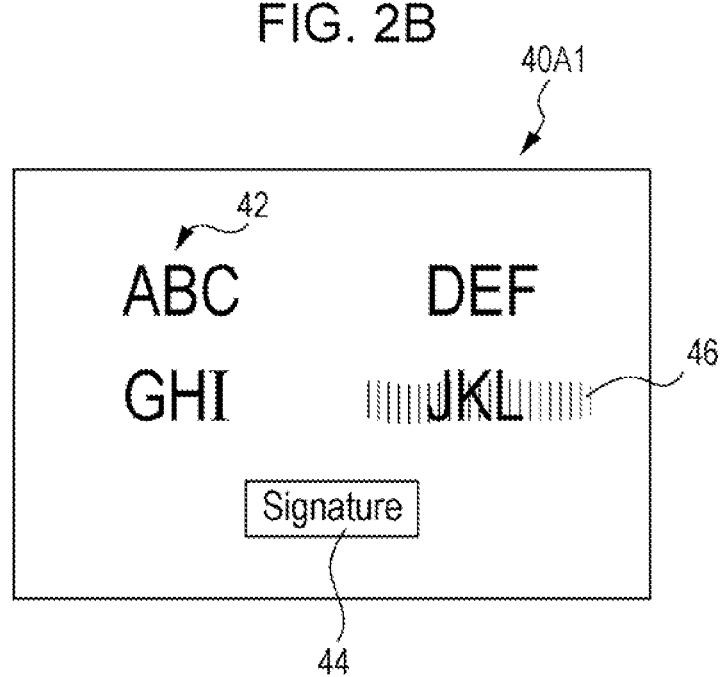
FIG. 2B is a front view illustrating an example of a specific color elimination image according to an exemplary embodiment.

In this exemplary embodiment, for example, as illustrated in FIG. 2B, a reddish color, which is the color of the added image 44 added by the seal, is defined as an elimination color. Accordingly, a specific color is defined as a color different from the document color and the reddish color. Furthermore, a specific color elimination image 40A1 is generated by eliminating an added image 48A added by a highlighter pen in green, which is defined as a specific color, and an added image 48B added by a highlighter pen in blue, which is defined as a specific color, from the document image 40A. Then, an identification possible image is generated in which the parts of the image 42 that are rendered in the regions in which the added image 48A by the green highlighter pen and the added image 48B by the blue highlighter pen are added are concealed in the specific color elimination image.

In this exemplary embodiment, the case where the document image 40A in which the added image 44 by the seal is added to the document in which the image 42 is rendered in the document color is used will be explained. However, the present invention is not limited to this. For example, a document image in which an added image by a red pen or the like and an added image by a highlighter pen are added to a document in which an image is rendered in a document color may be used. Also in this case, the color of the added image by the red pen or the like is defined as an elimination color.

Figure 3A:
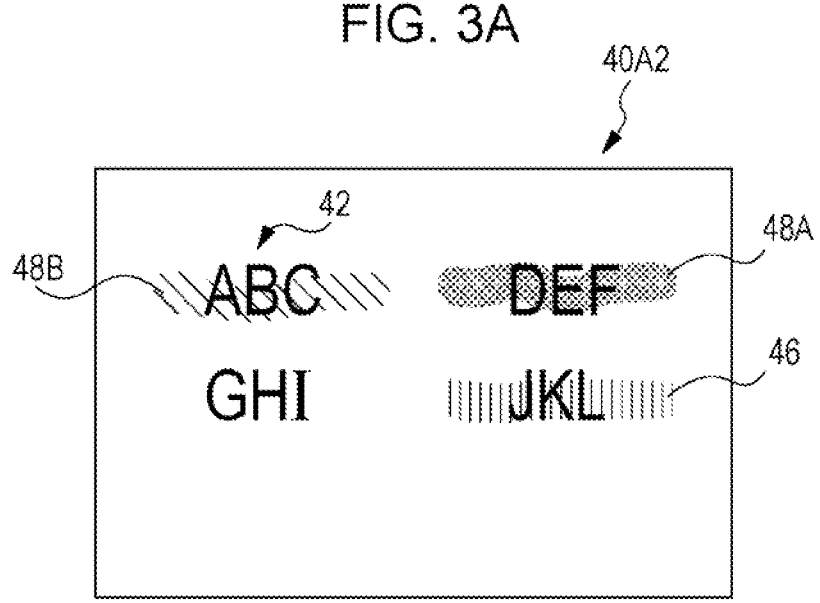
FIG. 3A is a front view illustrating another example of a document image according to an exemplary embodiment.
Figure 3B:
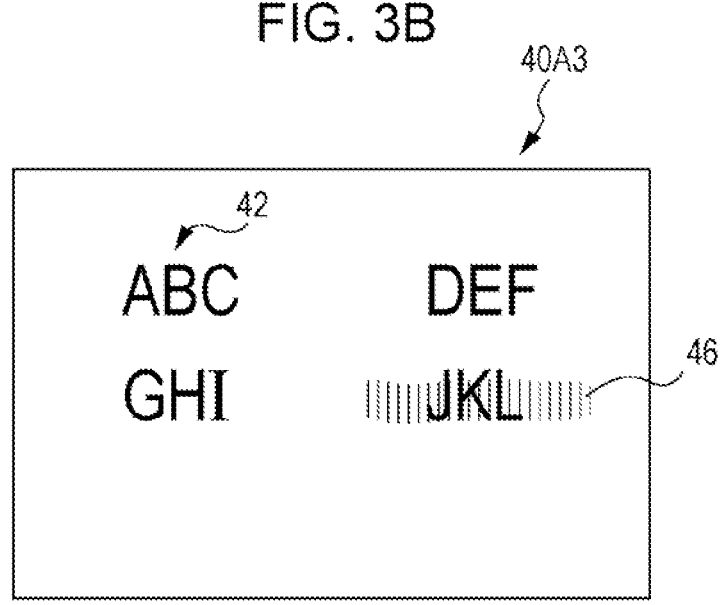
FIG. 3B is a front view illustrating another example of a specific color elimination image according to an exemplary embodiment.

Furthermore, for example, as illustrated in FIG. 3A, a document image 40A2 in which added images by highlighter pens in multiple colors are added to a document in which an image is rendered in a document color may be used. In this case, for example, as illustrated in FIG. 3B, by defining a reddish color as an elimination color, a specific color elimination image 40A3 may be generated by eliminating the added image 48A by a highlighter pen in green, which is defined as a specific color, and the added image 48B by a highlighter pen in blue, which is defined as a specific color, from the document image 40A2.

Figure 4:
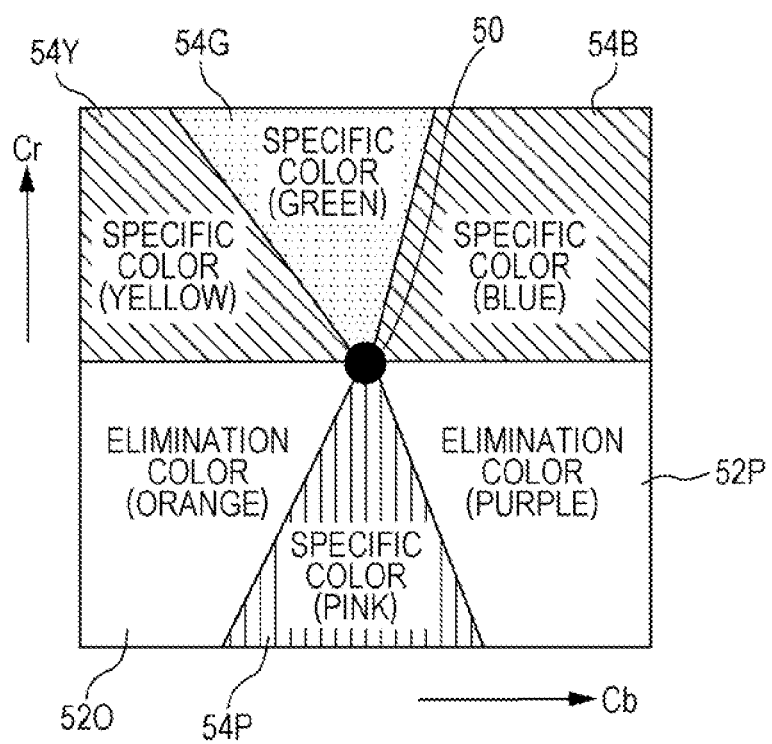
FIG. 4 is a schematic diagram illustrating an example of each color system in a color space which is set in an image generation process performed by an image processing apparatus according to an exemplary embodiment.

In this exemplary embodiment, an elimination color and a specific color are represented by a YCrCb color space. A YCrCb color space is a color space in which color information is divided into a luminance signal Y (gradation signal) and color difference signals Cr (red color signal) and Cb (blue color signal). For example, as illustrated in FIG. 4, in the case where a YCrCb color space is used, each color is represented by CrCb two-dimensional coordinates in which the vertical axis represents a Cr value and the horizontal axis represents a Cb value. On the two-dimensional coordinates, a central part corresponds to an achromatic color (black, white). In this exemplary embodiment, the central part is defined as a document color region 50, and the color (black) which belongs to the document color region 50 is defined as a document color.

Furthermore, in this exemplary embodiment, the two-dimensional coordinates are divided into multiple divided regions by multiple straight lines which extend from the central part of the two-dimensional coordinates toward the outer periphery. In the example illustrated in FIG. 4, a divided region with a high Cb value and a high Cr value corresponds to a blue divided region 54B, a divided region with a medium Cb value and a high Cr value corresponds to a green divided region 54G, and a divided region with a low Cb value and a high Cr value corresponds to a yellow divided region 54Y. Furthermore, a divided region with a high Cb value and a low Cr value corresponds to a purple divided region 52P, a divided region with a medium Cb value and a low Cr value corresponds to s pink divided region 54P, and a divided region with a low Cb value and a low Cr value corresponds to an orange divided region 52O. Moreover, in the example illustrated in FIG. 4, the purple divided region 52P and the orange divided region 52O are specified as elimination colors, and the blue divided region 54B, the green divided region 54G, the yellow divided region 54Y, and the pink divided region 54P are specified as specific colors.

The color of each pixel of a document image is categorized according to the divided region to which a Cr value and a Cb value of the pixel value belongs, and the color of each added image added to the document image is identified.

In this exemplary embodiment, an elimination color is specified by the range of an angle at the central part on the CrCb two-dimensional coordinates. In this exemplary embodiment, an elimination color is represented, based on the YCrCb color space, by the angle at the central part on the CrCb two-dimensional coordinates, as described above. However, an elimination color is not necessarily represented by such a color space. For example, a different color space such as a Lab color space may be used.

Furthermore, in this exemplary embodiment, a color which belongs to the green divided region is defined as a greenish color, a color which belongs to the blue divided region is defined as a bluish color, and a color which belongs to the yellow divided region is defined as a yellowish color. Furthermore, a color which belongs to the purple divided region, the pink divided region, or the orange divided region is defined as a reddish color. The color of the added image 44 by the seal and the color of the added image by the red pen are defined as reddish colors.

Figure 5:
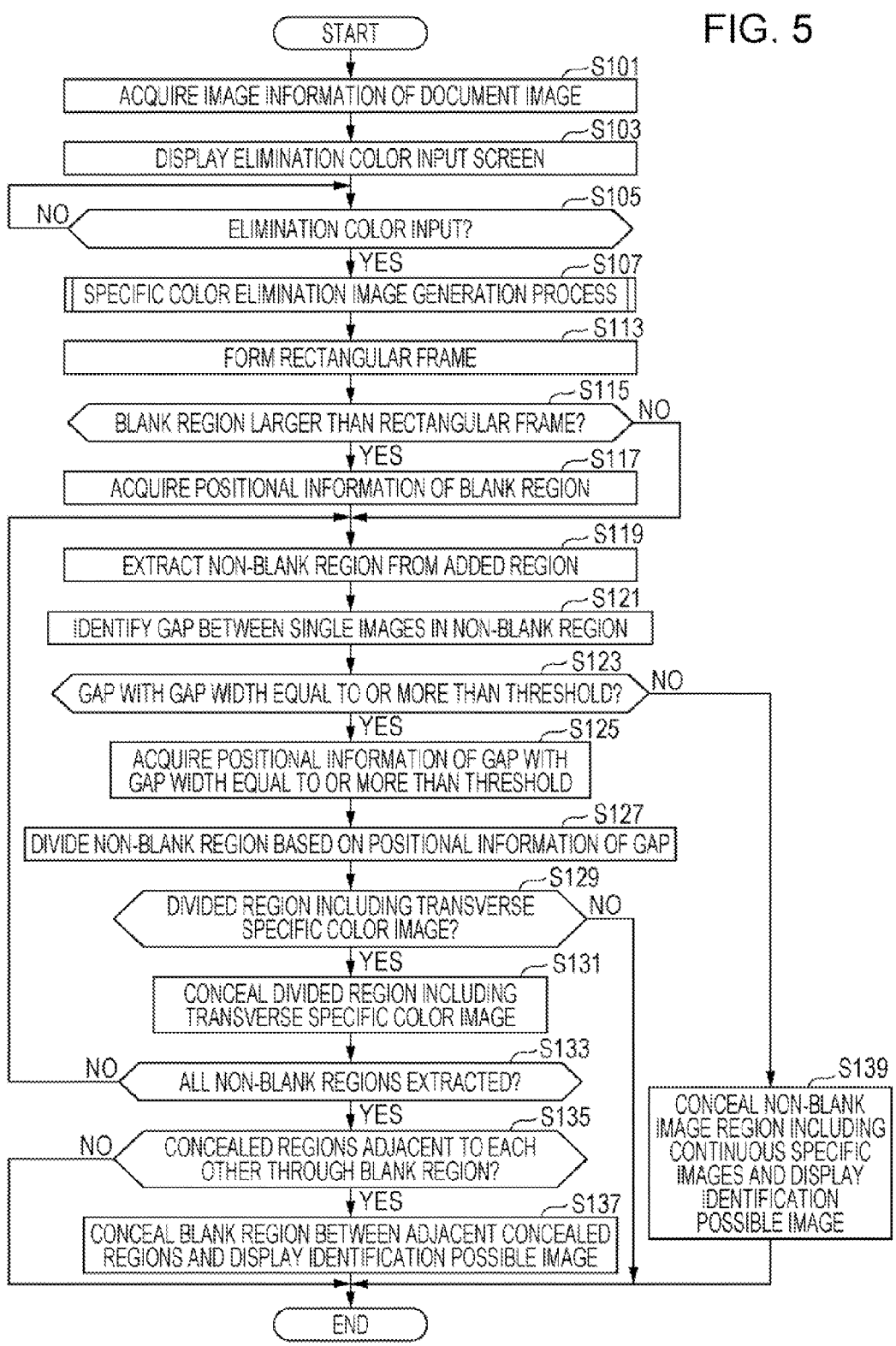
FIG. 5 is a flowchart illustrating a processing flow of a program of an image generation process according to an exemplary embodiment.
Figure 7:
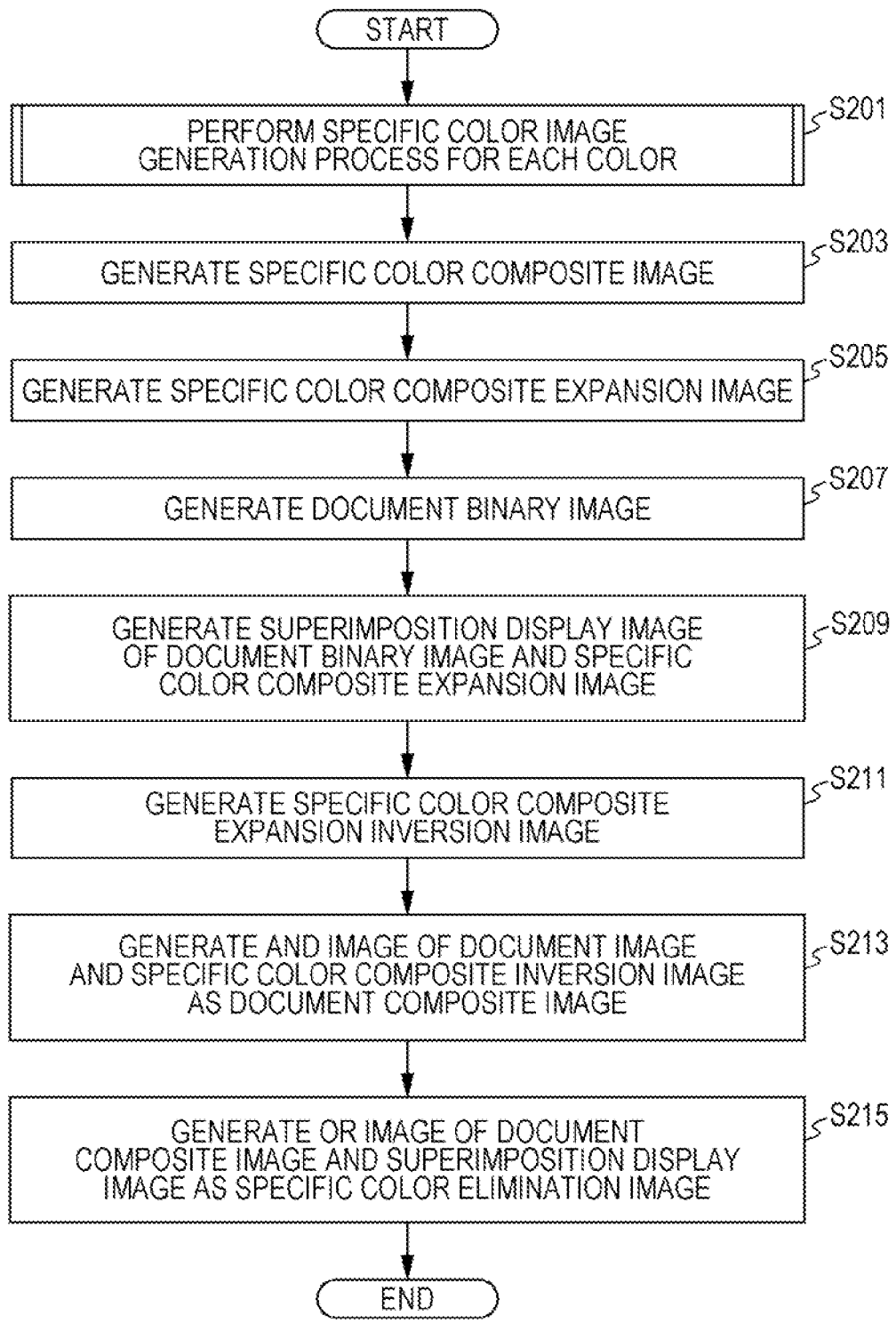
FIG. 7 is a flowchart illustrating a processing flow of a routine program of a specific color elimination image generation process according to an exemplary embodiment.
Figure 9:
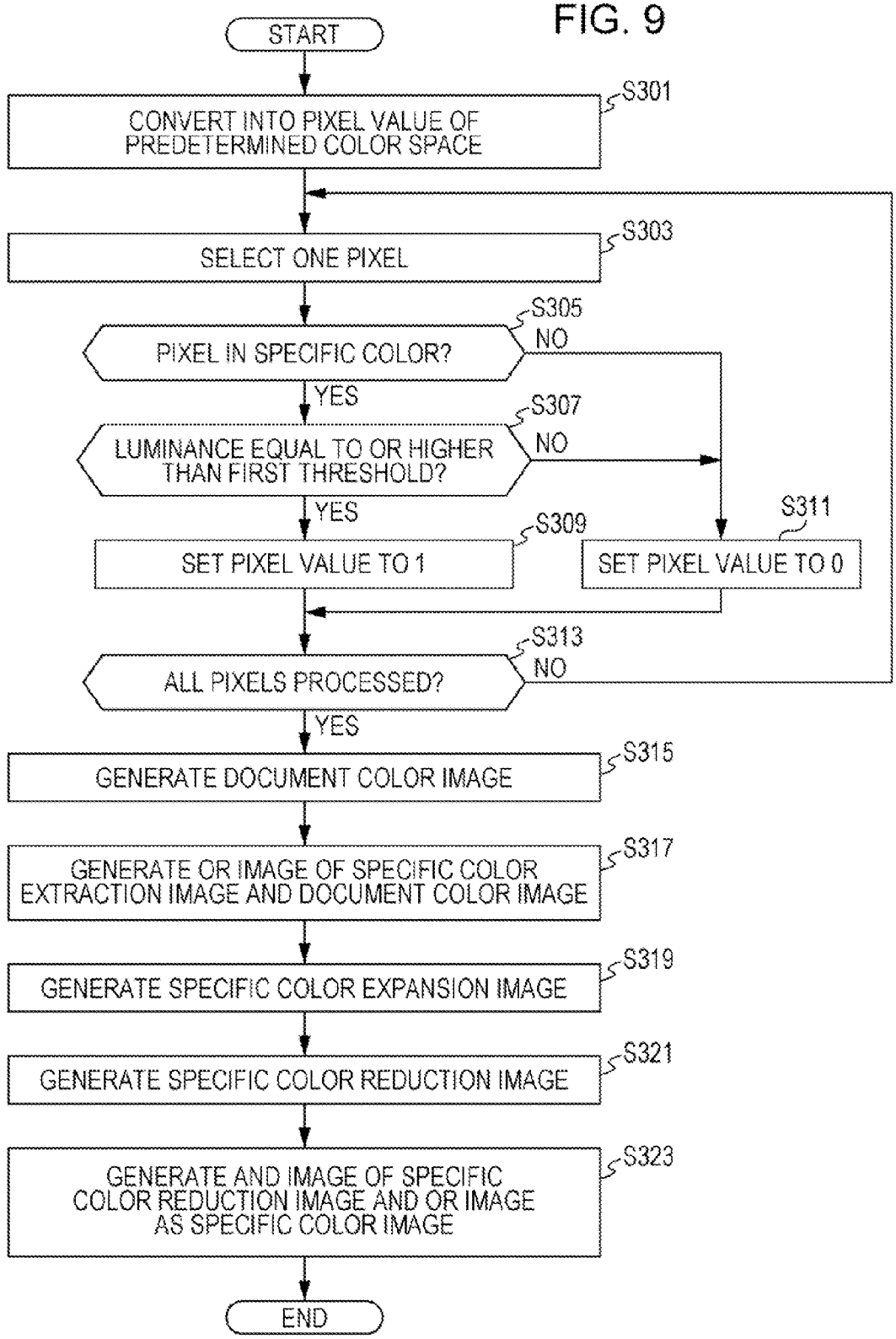
FIG. 9 is a flowchart illustrating a processing flow of a routine program of a specific color image generation process according to an exemplary embodiment.

Next, the processing flow of an image generation process performed by the CPU 14 of the image processing apparatus 10 according to this exemplary embodiment in accordance with an execution instruction via the operation unit 24 will be explained with reference to flowcharts illustrated in FIGS. 5, 7, and 9. FIG. 5 is a flowchart illustrating the process flow of a program of the image generation process. FIG. 7 is a flowchart illustrating the processing flow of a routine program of a specific color elimination image generation process. FIG. 9 is a flowchart illustrating the processing flow of a routine program of a specific color image generation process.

In this exemplary embodiment, each of the above programs is stored in advance in the nonvolatile memory 20. However, the present invention is not limited to this. For example, each of the above programs may be received from an external apparatus via the communication unit 28 and stored into the nonvolatile memory 20. Furthermore, when each of the above programs stored in a recording medium such as a compact disc read-only memory (CD-ROM) is read by a CD-ROM drive or the like via the I/O interface 22, each of the above processes may be executed.

In step S101, image information of the document image 40A is acquired by being read with the reader 30. The document image 40A is a document image in which the added image 44 by the seal and the added images 46, 48A, and 48B by the highlighter pens are added to a document in which an image is rendered in a document color. A method for acquiring the image information is not limited to this. The image information may be acquired by being read with an external reader and received via the communication unit 28. Furthermore, image information which is stored in advance in the nonvolatile memory 20 may be acquired.

Figure 6:
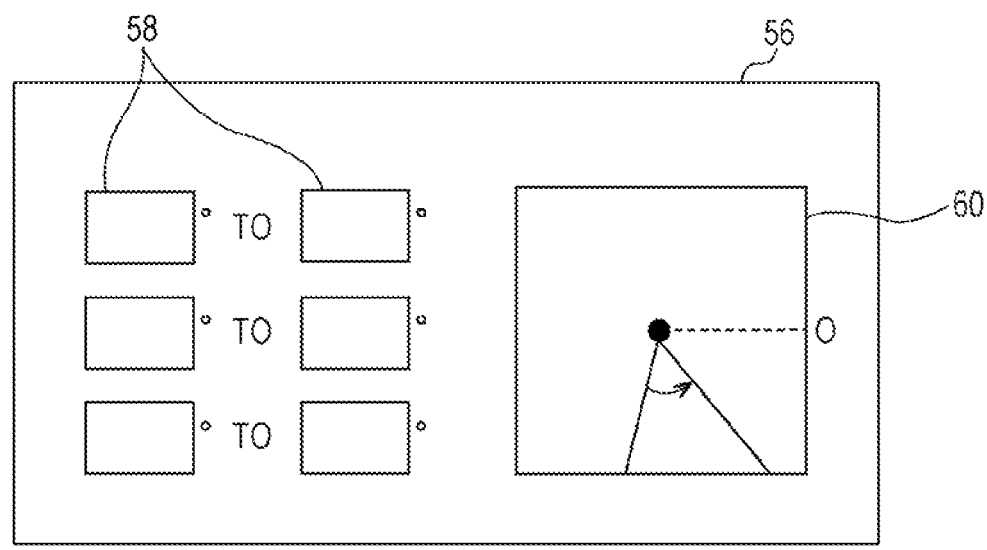
FIG. 6 is a front view illustrating an example of an elimination color input image screen according to an exemplary embodiment.

In step S103, the display unit 26 is controlled to display an elimination color input screen for inputting information which indicates an elimination color to be used for identifying the added images 46, 48A, and 48B from the document image 40A. For example, as illustrated in FIG. 6, an elimination color input screen 56 includes input fields 58 for inputting an elimination color as the range of an angle in the YCrCb color space, and a display field 60 for visually displaying an input elimination color on the YCrCb two-dimensional coordinates. A user inputs, via the operation unit 24, a desired elimination color as the range of an angle.

In this exemplary embodiment, the case where an elimination color is input as the range of an angle when information which indicates the elimination color is input will be explained. However, the present invention is not limited to this. Information which indicates an elimination color may be input by specifying any one of divided regions of the CrCb two-dimensional coordinates. Alternatively, information which indicates an elimination color may be input by specifying both end positions of the elimination color on the CrCb two-dimensional coordinates.

In step S105, it is determined whether or not an elimination color is input. When an elimination color is input (S105; Yes), the process proceeds to step S107. When no elimination color is input (S105; No), the process repeats the determination until an elimination color is input.

Figure 8:
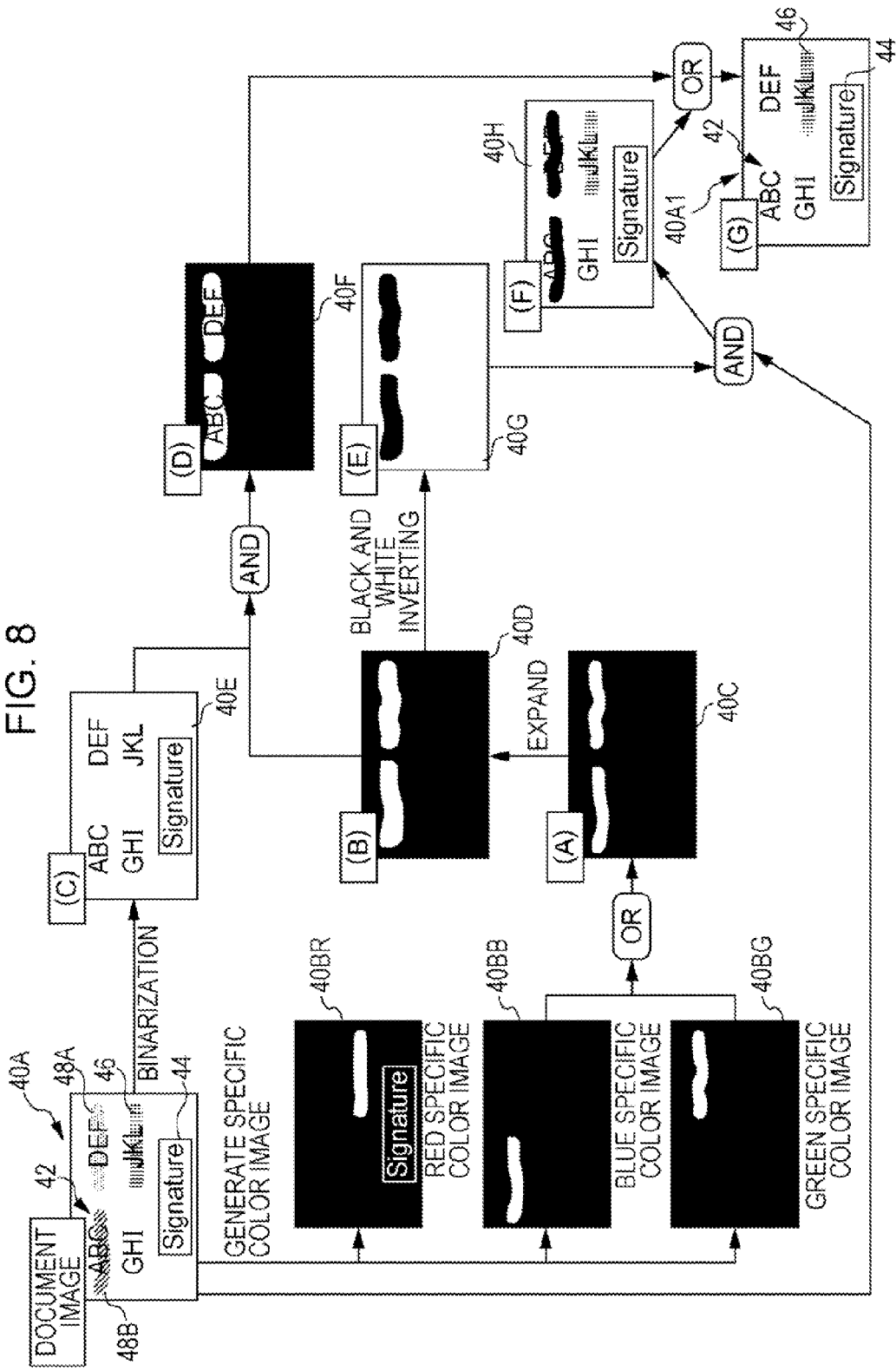
FIG. 8 is an explanatory diagram illustrating each step of a routine program of a specific color elimination image generation process according to an exemplary embodiment.

In step S107, a specific color elimination image generation process for generating the specific color elimination image 40A1 in which a specific color image is eliminated from the document image 40A, is performed. The processing flow of the specific color elimination image generation process performed by the CPU 14 of the image processing apparatus 10 according to this exemplary embodiment will be explained with reference to the flowchart illustrated in FIG. 7 and an explanatory diagram illustrated in FIG. 8.

In step S201, the specific color image generation process for generating a specific color image by extracting a specific color image from the document image 40A is performed for each color. The processing flow of the specific color image generation process performed by the CPU 14 of the image processing apparatus 10 according to this exemplary embodiment will be explained with reference to a flowchart illustrated in FIG. 9 and an explanatory diagram illustrated in FIG. 10.

Figure 10:
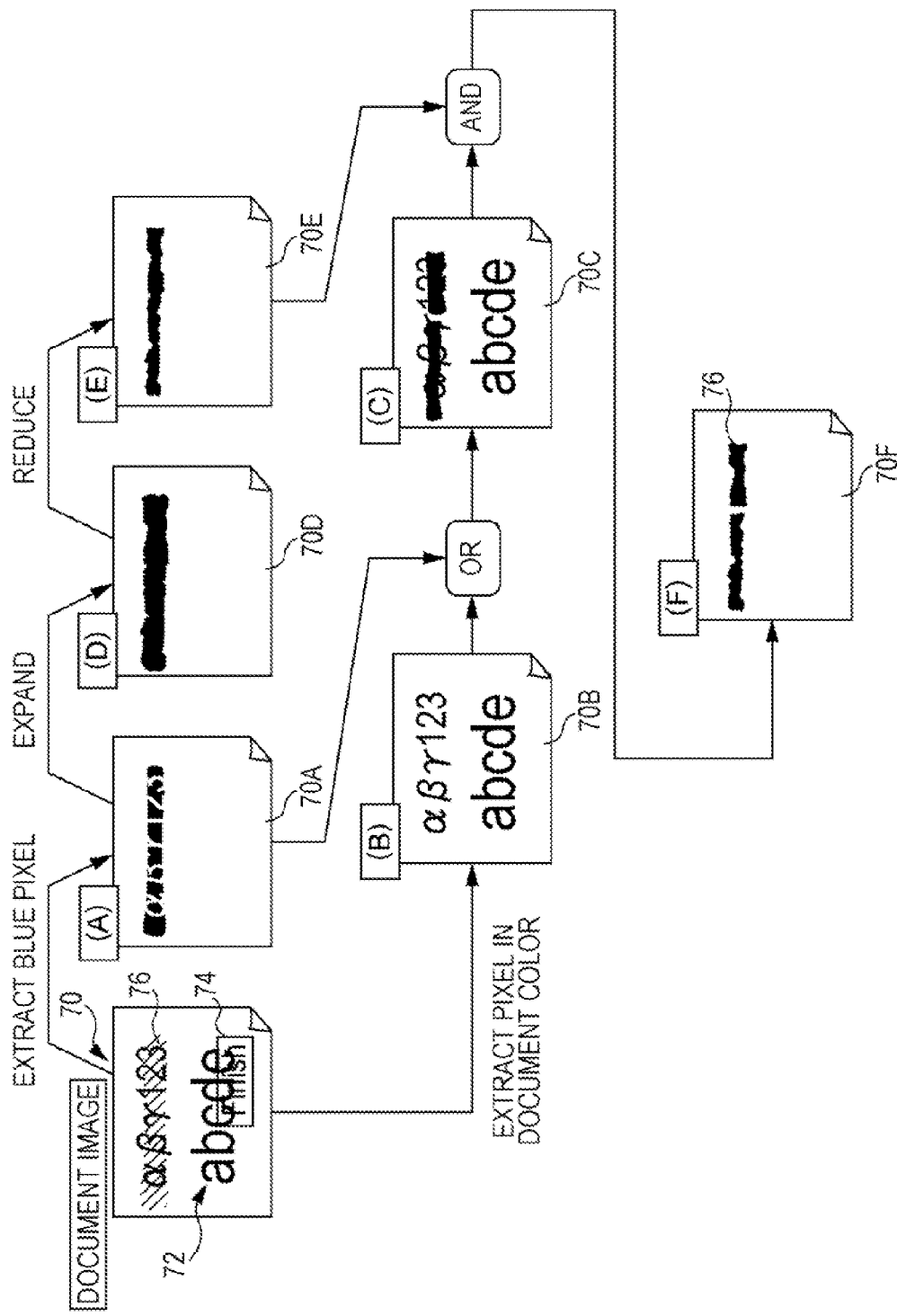
FIG. 10 is an explanatory diagram illustrating each step of a routine program of a specific color image generation process according to an exemplary embodiment.

For example, the case where a specific color elimination image is generated in a document image 70 which is obtained by reading, with the reader 30, a document which includes an image 72 rendered in a document color and an added image 74 by a seal and an added image 76 by a blue highlighter pen added thereto, as illustrated in FIG. 10, will be explained. In this example, the case where a specific color image which is obtained by extracting only the added image 76 in blue, which is defined as a specific color, is generated will be explained. However, if there are multiple specific colors, the specific color image generation process is performed for each color to generate a specific color image for each color.

In step S301, the pixel value of each pixel of the document image 70 represented by the image information acquired in step S101 is converted into a pixel value of a predetermined color space. In this exemplary embodiment, image information in which the pixel value of each pixel is represented by RGB is acquired in step S101, and the pixel value of each pixel of an image represented by the acquired image information is converted into a pixel value represented by YCrCb.

In step S303, one pixel is selected from the pixels of the document image 70 represented by the converted image information. In this exemplary embodiment, pixels are selected one by one in order from left to right in front view, starting from the pixel on the upper left corner in front view. After pixels for one row are selected, the pixels on the row immediate below the selected row in front view are sequentially selected.

In step S305, it is determined whether or not a selected pixel belongs to a specific color. In this exemplary embodiment, when the Cr value and the Cb value of the acquired pixel value belongs to the blue divided region 54B in the YCrCb color space illustrated in FIG. 4, the pixel value is determined to belong to the specific color.

In step S307, it is determined whether or not the luminance of the selected pixel is equal to or higher than a first threshold, which is a criterion of whether or not noise at a reading time occurs. This noise occurs when a black image is read. If such noise occurs, the black pixel may be read as a blue pixel. However, even in the case where a black pixel is read as a blue pixel due to this noise, since the pixel at which the noise occurs has a luminance lower than a normal blue pixel, it may be determined, by determining whether or not the luminance is lower than the first threshold, whether or not noise occurs.

When it is determined in step S307 that the luminance of the selected pixel is equal to or higher than the first threshold (step S307; Yes), the process proceeds to step S309. When it is determined in step S307 that the luminance of the selected pixel is lower than the first threshold (S307; No), the process proceeds to step S311.

In step S309, the pixel value of the selected pixel is set to 1. In contrast, in step S311, the pixel value of the selected pixel is set to 0.

In step S313, it is determined whether or not the conversion processing of steps S303 to S311 has been performed for all the pixels of the document image 70. When it is determined in step S313 that the conversion processing has been performed for all the pixels (S313: Yes), the process proceeds to step S315. When it is determined in step S313 that the conversion processing has not been performed for all the pixels (S313; No), the process returns to step S303, and the conversion processing of steps S303 to S311 is performed for an unprocessed pixel.

By the conversion processing of steps S309 and S311, a specific color extraction image 70A is generated in which the acquired image is a binary image which represents a specific color by 1 and represents a color different from the specific color by 0, as illustrated in step (A) of FIG. 10. That is, the specific color extraction image 70A is a binary image obtained by extracting only an image of the specific color from the document image 70.

In step S315, a document color image is generated by extracting only an image of the document color from the document image 70. In this exemplary embodiment, it is determined whether or not the pixel value of each pixel of the document image 70 belongs to the document color region 50 of the color space illustrated in FIG. 4. By representing the pixel value of a pixel which belongs to the document color region 50 by 1 and representing the pixel value of a pixel which does not belong to the document color region 50 by 0, a document color image is generated. Accordingly, as illustrated in step (B) of FIG. 10, a document color image 70B is generated in which the acquired image is a binary image which represents the document color by 1 and a color different from the document color by 0. That is, the document color image 70B is a binary image obtained by extracting only an image of the document color from the document image 70.

In step S317, an OR image is generated by performing OR operation on the specific color extraction image 70A which is generated by the conversion processing of steps S303 to S311 and the document color image 70B which is generated in step S315 for each bit. Accordingly, as illustrated in step (C) of FIG. 10, an OR image 70C is generated by extracting only the document color image and the specific color image from the document image 70.

In step S319, a specific color expansion image is generated by performing expansion processing for the specific color extraction image 70A. That is, pixels in which the added images 48A and 48B by highlighter pens are superimposed on the image 42 in the document color are inevitably recognized as pixels in the document color, in spite of being in specific colors. The falsely recognized pixels which are recognized as pixels of the document in spite of being specific colors, are not represented by pixels in specific colors in the specific color extraction image 70A. In the expansion processing, if a character or the like rendered in the document color is included in the added images 48A and 48B, a black part of the specific color extraction image is expanded at an expansion ratio at which a falsely recognized pixel corresponding to a character or the like may be interpolated with a pixel representing a specific color. Accordingly, as illustrated in step (D) of FIG. 10, a specific color expansion image 70D is generated by expanding the black part of the specific color extraction image 70A. In the case where a character or the like rendered in the document color is included in the added images 48A and 48B, a falsely recognized pixel which corresponds to the character or the like is interpolated with a pixel representing a specific color in the specific color expansion image 70D.

In step S321, a specific color reduction image is generated by performing reduction processing for the specific color expansion image 70D generated in step S319. Accordingly, as illustrated in step (E) of FIG. 10, a specific color reduction image 70E is generated in which the expanded black part of the specific color extraction image 70A is reduced to the original size. At this time, in the case where a character or the like rendered in the document color is included in the added images 48A and 48B, a falsely recognized pixel which corresponds to the character or the like is interpolated with a pixel which represents a specific color also in the specific color reduction image 70E.

In step S323, an image obtained by performing AND operation on the specific color reduction image 70E generated in step S321 and the OR image 70C generated in step S317 for each bit is generated as a specific color image, and the execution of the routine program of the specific color image generating process ends. Accordingly, as illustrated in step (F) of FIG. 10, even in the case where a character or the like rendered in the document color is included in the added images 48A and 48B, a specific color image 70F is generated in which a falsely recognized pixel which corresponds to the character or the like is interpolated with a pixel which represents a specific color.

In the processing described above, in each binary image, the pixel value of a black pixel is represented by 1 and the pixel value of a white pixel is represented by 0. Therefore, in the case where one is a black pixel (1) and the other is a white pixel (0), the result of the AND operation is white (0) and the result of the OR operation is black (1). In the subsequent processing, in each binary image, the pixel value of a black pixel is represented by 0 and the pixel value of a white pixel is represented by 1. Therefore, in the case where one is a black pixel (0) and the other is a white pixel (1), the result of the AND operation is black (0) and the result of the OR operation is white (1).

In step S203 of FIG. 7, the specific color images 70F in individual colors generated in the specific color image generation process illustrated in FIG. 9 are combined together, and a specific color composite image is thus generated. At this time, in this exemplary embodiment, the specific color images 70F in the individual colors are black and white inverted and then combined together. Accordingly, as illustrated in step (A) of FIG. 8, a specific color composite image 40C is generated by combining a blue specific color image 40BB and a green specific color image 40BG. A specific color image 40BR in red, which is an elimination color, is not combined in the specific color composite image 40C.

In step S205, a specific color composite expansion image is generated by performing expansion processing for the specific color composite image 40C generated in step S203. In this expansion processing, a white part of a specific color extraction image is expanded at an expansion ratio which includes an error of a borderline generated by various types of image processing. Accordingly, as illustrated in step (B) of FIG. 8, a specific color composite expansion image 40D is generated by expanding a white part of the specific color composite image 40C.

In step S207, a document binary image is generated by representing the pixel value of each pixel of the document image 40A by 1 when the luminance of the pixel value is lower than or equal to a predetermined threshold and representing the pixel value by 0 when the luminance of the pixel value is higher than the predetermined threshold. The predetermined threshold is a luminance which is lower than the luminance of the added images 46, 48A, and 48B added by highlighter pens and higher than the luminance of the added image 44 added by a seal. Accordingly, as illustrated in step (C) of FIG. 8, a document binary image 40E is generated in which the added images 46, 48A, and 48 added by highlighter pens are eliminated and only the added image 44 added by a seal and the image 42 in the document color are rendered in the document image 40A.

In step S209, as a superimposition display image, an AND image is generated by performing AND operation on the document binary image 40E generated in step S207 and the specific color composite expansion image 40D generated in step S205 for each bit. Accordingly, as illustrated in step (D) of FIG. 8, a superimposition display image 40F is generated in which the image 42 in the document color is rendered inside the added images 48A and 48B added by highlighter pens.

In step S211, a specific color composite expansion inversion image is generated by black and white inverting the specific color composite expansion image 40D generated in step S205. Accordingly, as illustrated in step (E) of FIG. 8, a specific color composite expansion inversion image 40G is generated in which the added images 48A and 48B added by highlighter pens are expanded and then rendered in black.

In step S213, as a document composite image, an AND image is generated by performing AND operation on the document image 40A and the specific color composite expansion inversion image 40G generated in step S211 for each bit. Accordingly, as illustrated in step (F) of FIG. 8, a document composite image 40H is generated in which the added images 48A and 48B added by highlighter pens are expanded and then rendered in black.

In step S215, the specific color elimination image 40A1 is generated by performing OR operation on the document composite image 40H generated in step S213 and the superimposition display image 40F generated in step S209 for each bit. Then, the execution of the routine program of the specific color elimination image generation process ends. Accordingly, as illustrated in step (G) of FIG. 8, the specific color elimination image 40A1 is generated in which the specific color image is eliminated from the document image 40A.

Figure 12:
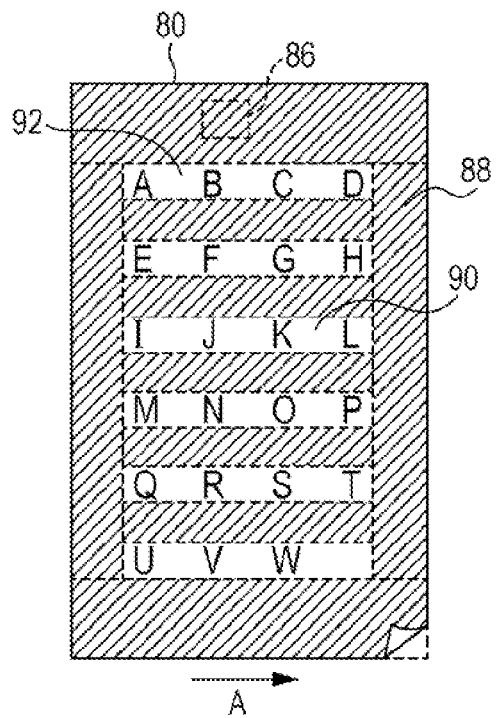
FIG. 12 is a schematic diagram illustrating an example of a case where a document image is divided into a blank region and a non-blank region according to an exemplary embodiment.

In step S113 of FIG. 5, a rectangular frame (in this case, for example, a square frame) with a predetermined size is formed. The "rectangular frame" mentioned above is, for example, a rectangular frame with a size larger than the size of a predetermined single image. The "predetermined single image" mentioned above is, for example, a predetermined character image of 12 points. For example, as illustrated in FIG. 12, a rectangular frame 86 which corresponds to the size of a character image of 13 points is used as an example of the rectangular frame. For example, the "rectangular frame which corresponds to the size of a character image of 13 points" mentioned above is a circumscribed rectangular frame for a sample character image (for example, a character image of "A" of 13 points). Although the rectangular frame 86 is used in this exemplary embodiment, a round frame or a polygonal frame other than a rectangular frame may be used.

Figure 11:
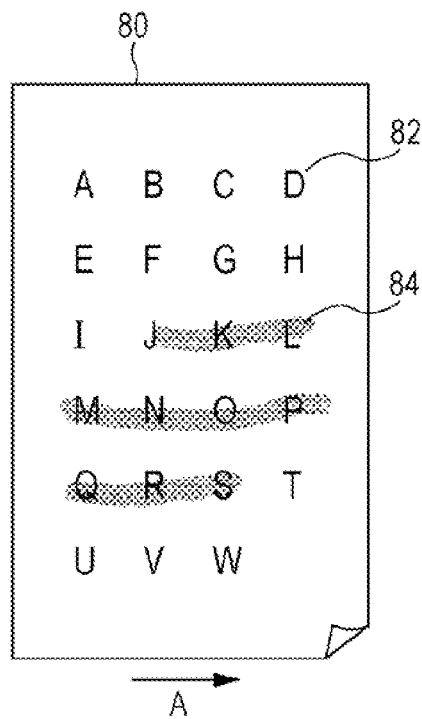
FIG. 11 is a schematic diagram illustrating an example of a case where a segment-like image is added as an added image to a document according to an exemplary embodiment.

In step S115, it is determined whether or not a blank region 88 that is larger than the rectangular frame 86 formed in step S113 exists in an added region which represents a region in which a specific color image is added in the document image 40A. In this exemplary embodiment, a case where, an image 82 is rendered in a document color in a document image 80 and a segment-like image is added as a specific color image 84 as illustrated in FIG. 11 will be explained. When it is determined in step S115 that the blank region 88 that is larger than the rectangular frame 86 (S115; Yes) exists, the process proceeds to step S117. When it is determined in step S115 that the blank region 88 that is larger than the rectangular frame 86 does not exist (S115; No), the process proceeds to step S119.

In step S117, blank region positional information which indicates the position of the blank region 88 that is larger than the rectangular frame 86 formed in step S113 is acquired based on the added region, and is stored into the nonvolatile memory 20.

In step S119, from among regions (hereinafter, referred to as "non-blank regions 90") other than the blank region 88 of the added region, a single non-blank region 90 that has not been processed in step S121, which will be described later, is extracted, based on the blank region positional information stored in the nonvolatile memory 20. The "single non-blank region" mentioned above indicates, for example, a region which is different from the blank region 88 illustrated in FIG. 12 (in the example of FIG. 12, an island region which includes a character image string in an image in a recorded region).

In step S121, a gap 92 between single images in the non-blank region 90 extracted in step S119 is identified. The "single image" mentioned above indicates, for example, a collection of continuous pixels in a document color or an elimination color. In the example of FIG. 12, each of images of alphabet letters "A", "B", . . . "W" corresponds to a single image.

In step S123, it is determined whether or not the size of the gap 92 (gap width) between single images identified in step S121 is equal to or greater than a threshold. When it is determined in step S123 that the gap 92 between the single images is equal to or greater than the threshold (S123; Yes), the process proceeds to step S125. When it is determined in step S123 that the size of the gap 92 between the single images is smaller than the threshold (S123; No), the process proceeds to step S139. The "threshold" mentioned above is, for example, a value which represents a predetermined gap width as a gap width between character images of 12 points and is set in advance prior to execution of the image generation process program. In the example of FIG. 12, in order to avoid complication, the case where all the gap widths between character images are equal to or greater than the threshold is illustrated.

Figure 13:
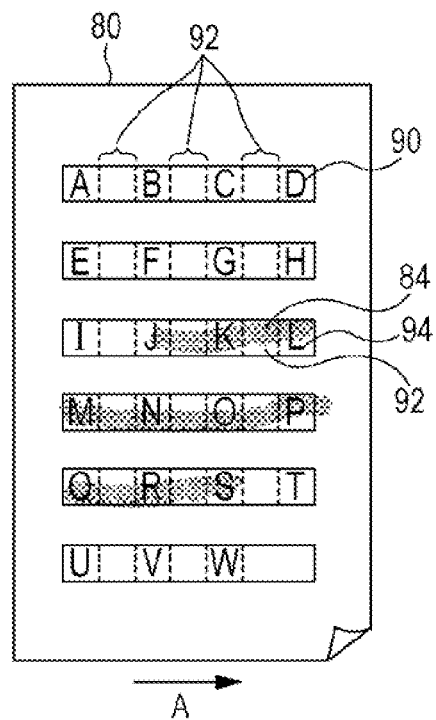
FIG. 13 is a schematic diagram illustrating an example of a case where a non-blank region of a document image is divided according to an exemplary embodiment.

In step S125, gap positional information which indicates the position of the gap 92 in the recorded region identified in step S117 is acquired. In step S127, based on the gap positional information acquired in step S125, the non-blank region 90 extracted in step S119 is divided by the gap 92 identified in step S121. FIG. 13 schematically illustrates an example of division of the non-blank region 90. As illustrated in FIG. 13, in this exemplary embodiment, each region defined by the outline of the gap 92 identified in step S121 and the non-blank region 90 extracted in step S119 is defined as a divided region 94.

In step S129, it is determined whether or not a divided region 94 obtained by division in step S127 includes a specific color image 84 which are transverse in a specific direction A. In other words, it is determined whether or not a divided region 94 which includes a specific color image 84 transverse in the specific direction exists. In the example of FIG. 13, the above divided region 94 is a divided region 94 which includes a specific mark image stretching between one and the other of a pair of sides which face each other in the specific direction (a boundary line segment of a predetermined length as a line segment which indicates the boundary in the specific direction A of the divided regions 94).

When it is determined in step S129 that the divided region 94 exists (S129; Yes), the process proceeds to step S131. When it is determined in step S129 that the divided region 94 does not exist (S129; No), the execution of the image generation process program ends.

Figure 14:
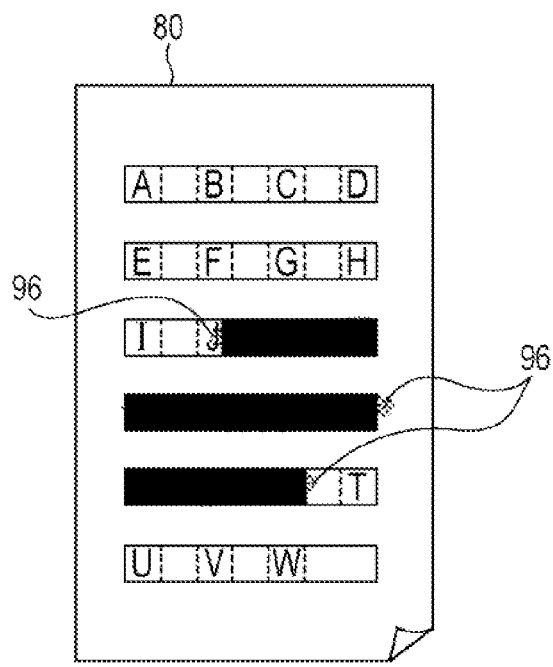
FIG. 14 is a schematic diagram illustrating an example of a case where a non-blank region of a document image is concealed (before a portion protruding from a concealment region is eliminated) according to an exemplary embodiment.
Figure 15:
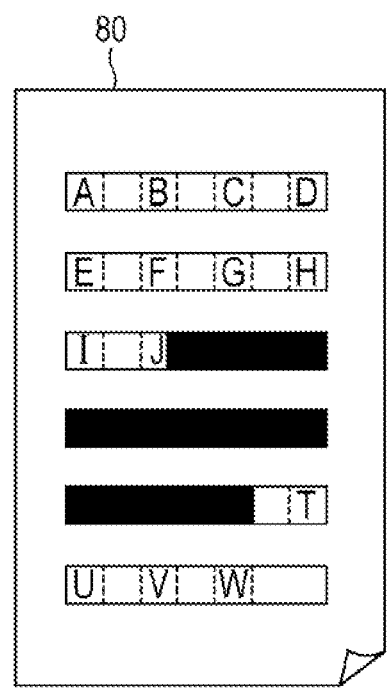
FIG. 15 is a schematic diagram illustrating an example of a case where a non-blank region of a document image is concealed (after a portion protruding from a concealment region is eliminated) according to an exemplary embodiment.

In step S131, the divided region 94 which includes the specific color image 84 transverse in the specific direction A is painted out for concealment, and the gap 92 between the divided regions 94 defined as targets of concealment are also painted out for concealment. The "concealment" mentioned above represents not only painting out a concealment target region in a specific color so as not to be visually recognized but also superimposing a pattern or a design on part of a concealment target region so as to be partially visually recognized. That is, all the regions of the non-blank region 90 that connect boundary line segments in which image regions corresponding to regions specified by specific marks represented by specific mark images stretch between the divided regions 94 in the specific direction A, among boundary segment lines of the individual divided regions 94, are concealed. In the example of FIG. 13, a segment-like mark as a specific mark image stretches over "J", "K", "L", "M", "N", "O", "P", "Q", "R", and "S". However, among the above letters, the divided regions 94 defined as concealment targets are the divided regions 94 which do not include "J" but do include "K", "L", "M", "N", "O", "P", "Q", "R", and "S". That is, since a segment-like mark is not transverse in the specific direction A in the divided region 94 which includes "J", the divided region 94 which includes "J" is not defined as a concealment target. Although the divided regions 94 which are defined as concealment targets and the gap 92 between the divided regions 94 are concealed by the execution of the processing of step S131, a segment-like mark protrudes at the divided region 94 which includes "J" and the gap 92 between "S" and "T", as illustrated in FIG. 14. Furthermore, a segment-like mark protrudes from a back end face of the fourth non-blank region 90 from the top of the image in the recorded region illustrated in FIG. 14. Obviously, such protruding portions 96 are segment-like marks which are not included in the concealment target region. In this case, for example, the protruding portions 96 illustrated n FIG. 14 may be eliminated, as illustrated in FIG. 15.

In step S133, it is determined whether or not all the non-blank regions 90 have been extracted from the added region. When it is determined in step S133 that all the non-blank regions 90 have been extracted (S133; Yes), the process proceeds to step S135. When it is determined in step S133 that all the non-blank regions 90 have not been extracted (S133; No), the process returns to step S119.

In step S135, it is determined, based on the blank region positional information stored in the nonvolatile memory 20, whether or not regions which are already concealed (hereinafter, referred to as "concealed regions") in the non-blank regions 90 are adjacent to each other through a blank region 88. In the examples illustrated in FIGS. 13 to 15, it is determined whether or not the concealed divided region 94 among the divided regions 94 obtained by division in step S127 and the concealed gap 92 are adjacent to each other through the blank region 88.

When it is determined in step S135 that the concealed regions are adjacent to each other through the blank region (S135; Yes), the process proceeds to step S137. When it is determined in step S135 that the concealed regions are not adjacent to each other through the blank region 88 (S135; No), the execution of the image generation process program ends.

In step S137, the blank region 88 over which the concealed regions overlap is concealed, and the thus obtained identification possible image is displayed on the display unit 26. Then, the concealing process program ends.

In step S139, from among the non-blank regions 90 extracted in step S119, a non-blank region 90 in which the specific color images 84 are recorded consecutively in the specific direction A is concealed. Furthermore, after the identification possible image obtained by concealment of the non-blank region 90 is displayed, execution of the image generation process program ends.

In this exemplary embodiment, the case where the generated identification possible image is displayed on the display unit 26 is explained. However, the present invention is not limited to this. The generated identification possible image may be printed by the printer 32. Furthermore, the generated identification possible image may be transmitted to an external apparatus via the communication unit 28.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an image information acquisition unit that acquires image information of a document image in which a plurality of colors that are different from a predetermined document color are added to an image which is rendered in the predetermined document color;
   an elimination color setting unit that sets a color which is defined as an elimination color from among the plurality of colors; and
   a processing unit that performs predetermined processing for a color among the plurality of colors that is different from the elimination color set by the elimination color setting unit.

2. The image processing apparatus according to claim 1, wherein the elimination color is a reddish color, and
wherein the specific color that is different from the elimination color among the plurality of colors is a color different from the reddish color.

3. The image processing apparatus according to claim 2, wherein the specific color is a bluish color.

4. An image processing apparatus comprising:
an acquisition unit that acquires image information of a document image in which a plurality of added images in a plurality of colors that are different from a predetermined document color are added to a document including an image rendered in the predetermined document color, and information of a color which is defined as an elimination color among the plurality of colors; and
a generation unit that generates a specific color elimination image which is obtained by eliminating a specific color image rendered in a specific color that is different from the elimination color among the plurality of colors from the plurality of added images of the document image.

5. The image processing apparatus according to claim 4, further comprising:
a reception unit that receives input of information which indicates the elimination color,
wherein the acquisition unit acquires the information which indicates the elimination color received by the reception unit.

6. The image processing apparatus according to claim 4, wherein the generation unit further generates an identification possible image in which a specific color image rendered in the specific color that is different from the elimination color among the plurality of colors is able to be identified in the document image.

7. The image processing apparatus according to claim 6, wherein the identification possible image is an image in which a specific color region which includes the specific color image added to the document image is concealed.

8. The image processing apparatus according to claim 6, further comprising:
an output unit that outputs, as the identification possible image, an image in which an image in the elimination color is rendered in the document color and a specific color region which includes the rendered specific color image is concealed in the document color.

9. The image processing apparatus according to claim 6, further comprising:
an output unit that outputs, as the identification possible image, an image in which a specific color region which includes the rendered specific color image is concealed in a color that is different from the document color and the elimination color.

10. An image processing method comprising:
acquiring image information of a document image in which a plurality of colors that are different from a predetermined document color are added to an image which is rendered in the predetermined document color;
setting a color which is defined as an elimination color from among the plurality of colors; and
performing predetermined processing for a color among the plurality of colors that is different from the set elimination color.

11. An image processing method comprising:
acquiring image information of a document image in which a plurality of added images in a plurality of colors that are different from a predetermined document color are added to a document including an image rendered in the predetermined document color, and information of a color which is defined as an elimination color among the plurality of colors; and
generating a specific color elimination image which is obtained by eliminating a specific color image rendered in a specific color that is different from the elimination color among the plurality of colors from the plurality of added images of the document image.

12. A non-transitory computer readable medium storing a program causing a computer to execute an image process, the process comprising:
acquiring image information of a document image in which a plurality of colors that are different from a predetermined document color are added to an image which is rendered in the predetermined document color;
setting a color which is defined as an elimination color from among the plurality of colors; and
performing predetermined processing for a color among the plurality of colors that is different from the set elimination color.

13. A non-transitory computer readable medium storing a program causing a computer to execute an image process, the process comprising:
acquiring image information of a document image in which a plurality of added images in a plurality of colors that are different from a predetermined document color are added to a document including an image rendered in the predetermined document color, and information of a color which is defined as an elimination color among the plurality of colors; and
generating a specific color elimination image which is obtained by eliminating a specific color image rendered in a specific color that is different from the elimination color among the plurality of colors from the plurality of added images of the document image.

14. An image processing apparatus comprising:
an image information acquisition unit that acquires image information of a document image in which a plurality of colors, including at least red and another color, that are different from a predetermined document color, including at least black and white, are added to an image which is rendered in the predetermined document color;
an elimination color setting unit that sets red which is defined as an elimination color from among the plurality of colors; and
a processing unit that performs predetermined processing for a color among the plurality of colors that is different from the elimination color set by the elimination color setting unit.

15. An image processing apparatus comprising:
an image information acquisition unit that acquires image information of a document image in which a plurality of colors, including at least red and blue, that are different from a predetermined document color, including at least black and white, are added to an image which is rendered in the predetermined document color;
an elimination color setting unit that sets red which is defined as an elimination color from among the plurality of colors; and a processing unit that performs predetermined processing for blue among the plurality of colors.

* * * * *